United States Patent [19]

Bouyoucos et al.

[11] Patent Number: 4,569,412
[45] Date of Patent: Feb. 11, 1986

[54] SEISMIC SOURCE

[75] Inventors: John V. Bouyoucos; Roger L. Selsam, both of Rochester, N.Y.

[73] Assignee: Hydroacoustics Inc., Rochester, N.Y.

[21] Appl. No.: 382,317

[22] Filed: May 26, 1982

[51] Int. Cl.$^4$ .................. G01V 1/04; E21B 47/00; E21B 4/14
[52] U.S. Cl. ...................................... 181/119; 175/1; 175/296; 367/911
[58] Field of Search ............... 181/113, 119, 120, 104, 181/106, 121; 367/31, 912, 172, 86, 911; 175/1, 296, 297

[56] References Cited

U.S. PATENT DOCUMENTS

| | | | |
|---|---|---|---|
| Re. 27,434 | 7/1972 | Vincent et al. | 175/296 X |
| 1,866,335 | 7/1932 | Yungling | 175/296 X |
| 2,993,553 | 7/1961 | Howes | 181/121 X |
| 3,185,223 | 5/1965 | Uhl | 175/296 X |
| 3,246,289 | 4/1966 | Mellen | 181/120 |
| 3,392,369 | 7/1968 | Dickie et al. | 181/120 X |
| 3,403,374 | 9/1968 | Mellen et al. | 181/120 X |
| 3,718,205 | 2/1973 | Fair et al. | 367/189 |
| 3,903,972 | 9/1975 | Bouyoucos | 173/78 X |
| 4,007,804 | 2/1977 | Hardison et al. | 181/116 X |
| 4,016,952 | 4/1977 | Reed et al. | 181/116 X |
| 4,030,063 | 6/1977 | Wallen | 367/143 |
| 4,042,063 | 8/1977 | Waters | 181/119 |
| 4,047,148 | 9/1977 | Hagemann | 367/143 |
| 4,147,228 | 4/1979 | Bouyoucos | 181/114 X |
| 4,153,135 | 5/1979 | Bouyoucos | 367/143 X |
| 4,211,301 | 7/1980 | Mifsud | 181/120 |
| 4,252,210 | 2/1981 | Sodich | 181/120 X |
| 4,278,136 | 7/1981 | Hansson | 173/78 X |
| 4,391,299 | 7/1983 | Holmes | 367/172 X |
| 4,458,343 | 7/1984 | Tehon et al. | 367/172 X |

Primary Examiner—Charles T. Jordan
Assistant Examiner—Brian S. Steinberger
Attorney, Agent, or Firm—M. LuKacher

[57] ABSTRACT

A seismic source operable in deep bore holes, and especially suitable for acoustic well logging and geophysical exploration, produces a controlled-spectrum seismic impulse. The source has a hammer which is hydraulically cocked through a hydraulic transformer into a hydraulic spring. Upon command, the hammer can be released, converting stored energy in the spring to kinetic energy of hammer motion. The hammer impacts on a liquid impulse shaping spring which couples impulse energy of controlled spectral width to the formation surrounding the hole by means of a balanced piston assembly which can be prebiased against the side walls of the hole.

8 Claims, 7 Drawing Figures

SEISMIC SOURCE

DESCRIPTION

The present invention relates to a seismic source, and particularly a seismic source for use in bore holes to produce a controlled-spectrum seismic impulse in the formation surrounding the hole.

The invention is especially suitable for acoustic well logging and geophysical exploration in the generation of seismic signals in deep bore holes which extend thousands of feet below the surface. Features of the invention may also be found useful for the generation of acoustic signals in environments, like deep bore holes, in which high overpressures exist.

The requirements of down hole operation prevents available seismic source technology from being directly applicable in providing a down hole seismic source. The ambient pressures (overpressure) in the hole may be up to 20,000 pounds per square inch (psi). The source must be accommodated in small diameter holes, for example, 4 inch diameter bore holes. The size and also the weight of the source should also permit it to be raised and lowered so as to enable the signals to be transmitted into the formation at various "shot points" along the length of the hole. The energy and spectral characteristics should also provide for effective processing of the received signals. For example, an impulse having an energy level exceeding one kilojoule within a frequency band of 50 to 200 Hz, or approaching such an energy level and band width is desired.

It is a feature of the present invention to provide an improved seismic source for use in bore holes utilizing hydraulic impact device technology in a new and improved manner with the objective of meeting the requirements for down hole seismic sources discussed above. For example, U.S. Pat. No. 4,147,228 issued to John V. Bouyoucos on Apr. 3, 1979 describes a hydraulically actuated impulse device which provides a seismic source with a liquid spring for shaping the spectrum of the impulses produced by the source which functions partially, but not entirely, in the same manner as a liquid spring which may be utilized in a down hole seismic source in accordance with the present invention.

It is an object of the present invention to provide an improved seismic source which may be used in bore holes and is operable at great depths down the hole in a high pressure environment.

It is a further object of the present invention to provide an improved hydraulic seismic source which is fully filled with hydraulic oil in operation.

It is a still further object of the present invention to provide an improved down hole seismic source of a size which can be accommodated in bore holes which may be of small diameter.

It is a still further object of the present invention to provide an improved hydraulically operated, down hole seismic source which may utilize commercially available pumps and valving.

It is a still further object of the present invention to provide an improved down hole seismic source which is operable to couple high level impulse energy of a controlled spectral width to the formation via the side walls of the hole, and at desired positions on the side walls along the length of the hole.

It is a still further object of the present invention to provide an improved hydraulically actuated down hole seismic source which may be readily transported, as by being broken down into sections.

It is a still further object of the present invention to provide an improved hydraulically actuated down hole seismic source which produces impulse energy with controlled timing.

Briefly described, a seismic source for use in bore holes which embodies the invention, has a housing with an elongated shape and cross-section to be received within the bore hole and to be lowered and raised therein. Contained in the housing are pressurized hydraulic fluid supply and control means, hydraulically operated hammer means, and means for coupling force impulses received from the hammer means to the walls of the bore hole at selected positions along the length of the bore hole. Transmission of the seismic signal resulting from the force impulses is from the wall of the bore hole out into the formation. The source may be pressure equalized with respect to the ambient pressure in the bore holes which is in communication with the hammer and coupling means of the source so as to enable the actuation thereof in the high pressure environment of the bore holes.

The foregoing and other objects, features and advantages of the invention, as well as a presently preferred embodiment thereof, will become more apparent from a reading of the following description in connection with the accompanying drawings in which.

Figure 1:
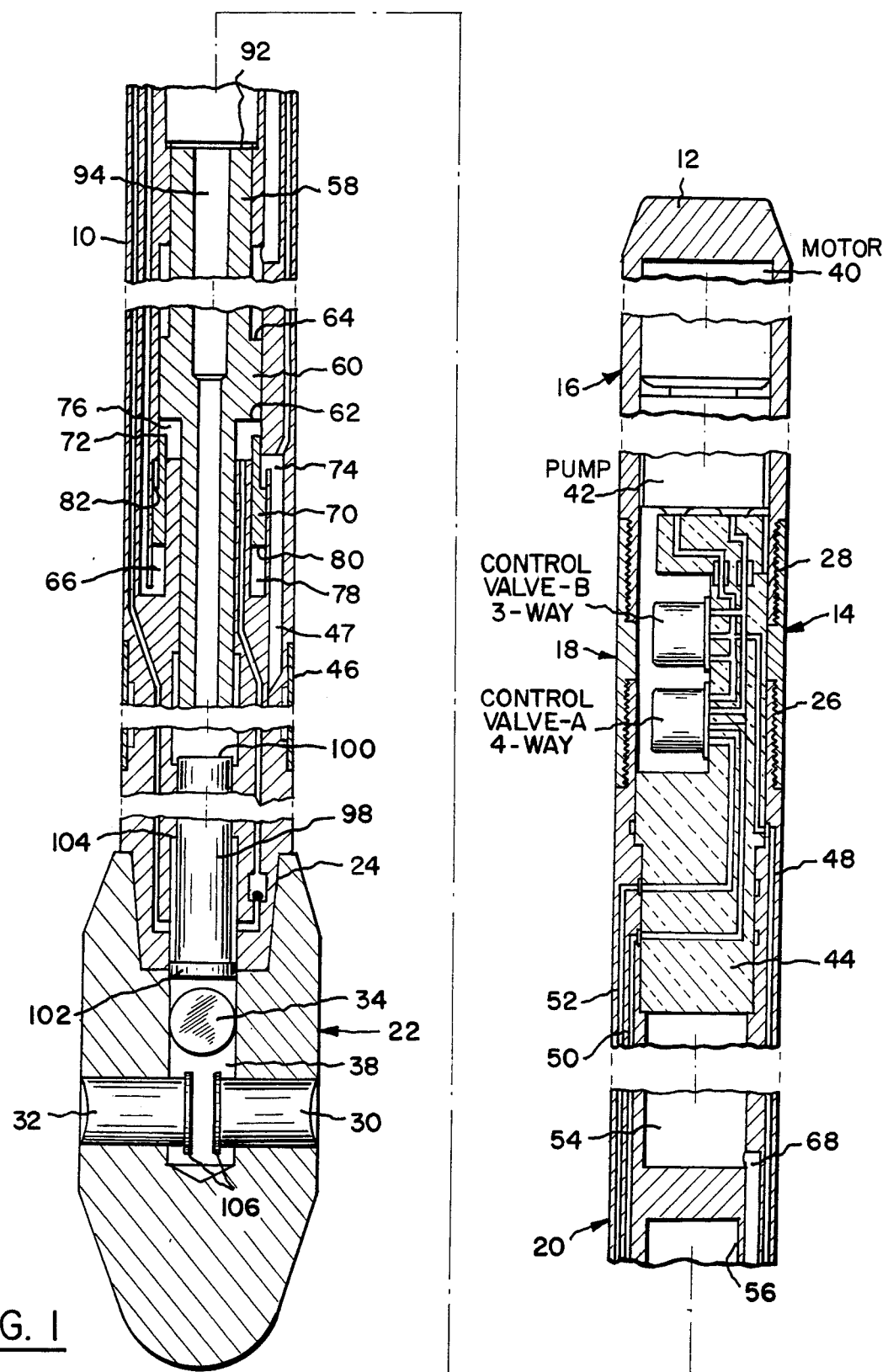
FIG. 1 is a diagrammatic, sectional view of a down hole seismic source in accordance with the invention.

Referring to the drawings and particularly to FIG. 1, there is shown a seismic source which generates seismic impulses from within a bore hole and at different positions (shot points) along the bore hole. The source has a housing 10. The housing is elongated so that it can be received in the bore hole and raised and lowered by a cable or hawser attached to the upper end 12 of the housing. The length of the source may vary, but in a presently preferred embodiment it is approximately 12 feet in length. The cable will contain an electrical power line and electrical control lines so that the source can be powered and controlled from the surface.

The housing and the components of the source contained therein have three major sections or subassemblies which may be divided into smaller sections for ease of transport. The major sections are the pressurized hydraulic fluid supply and control section 14, which may be divided into a motor and pump section 16 and a valve-manifold section 18. There is also a hammer section 20 and a coupling or load section 22. The hammer section may be divided into subsections. Each of the sections or subsections are connected by tapered, threaded joints, as shown at 24 between the coupling and hammer section, at 26 between the pressurized hydraulic fluid supply and control section and at 28 between the motor and pump and valve-manifold subsections 16 and 18.

Figure 2:
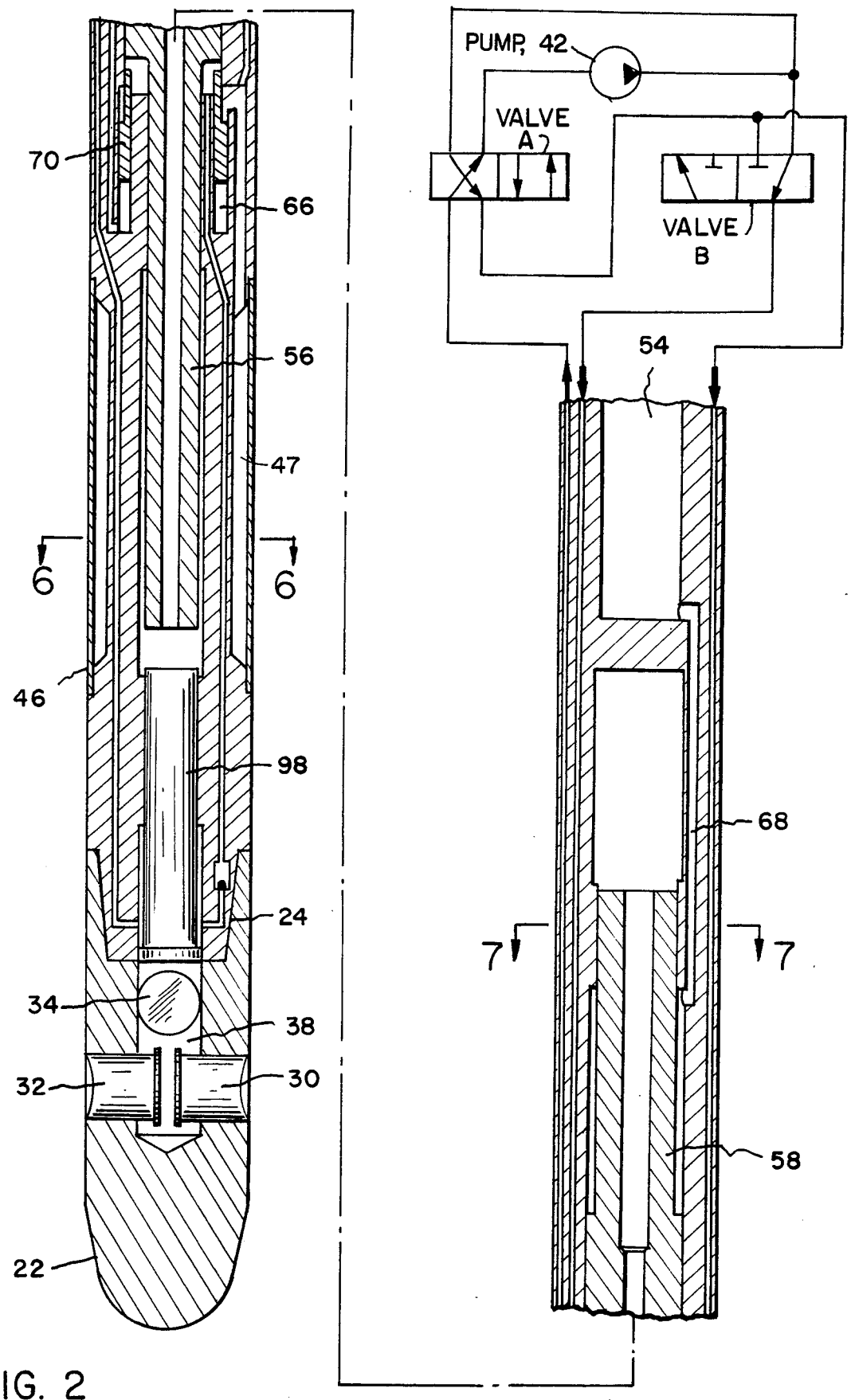
FIGS. 2, 3 and 4 are sectional views similar to FIG. 1, but with a coupling section of smaller diameter, and in different positions during different portions of the operating cycle of the source, the hydraulic fluid supply pump and control valve being shown schematically.
Figure 3:
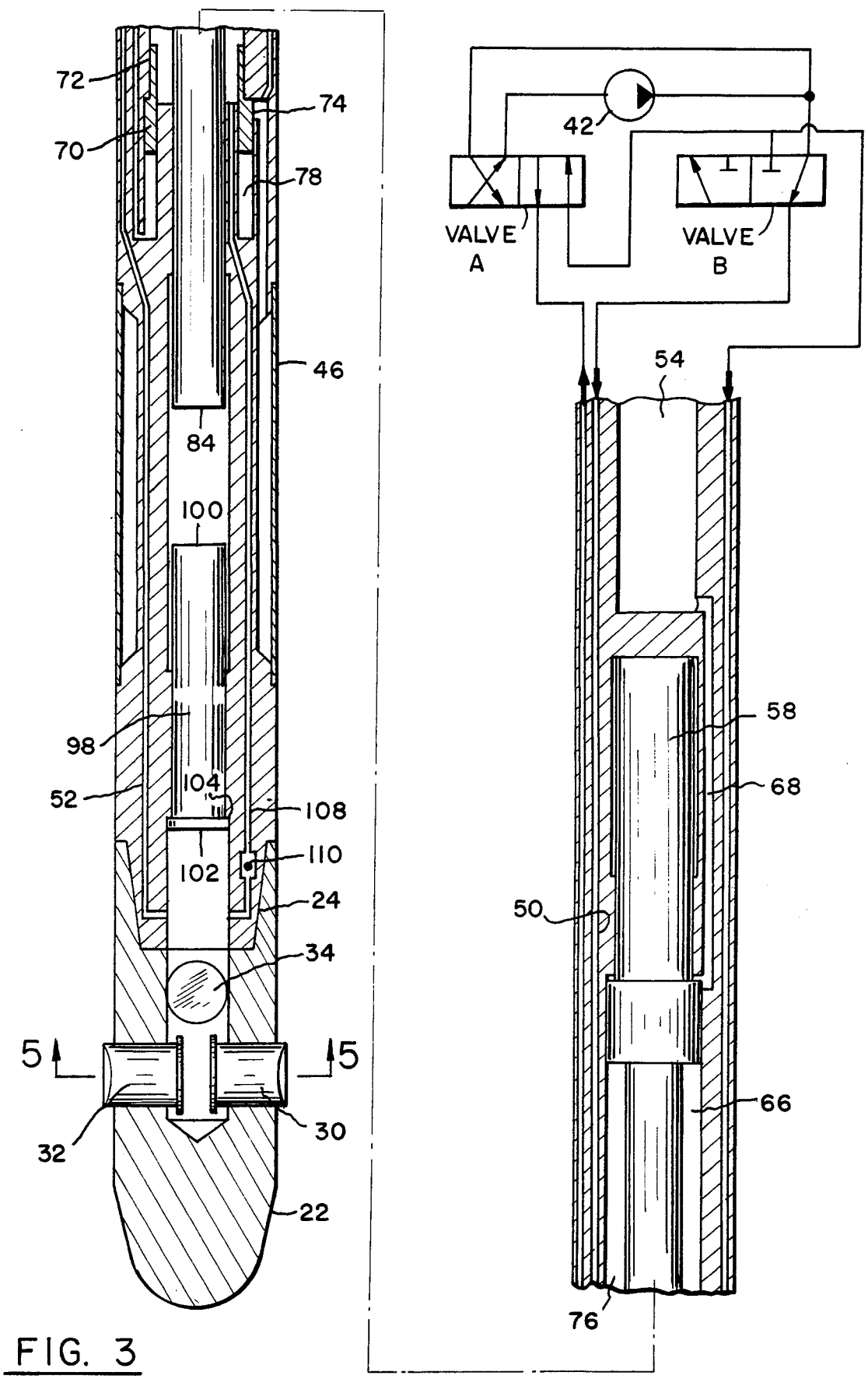
Figure 4:
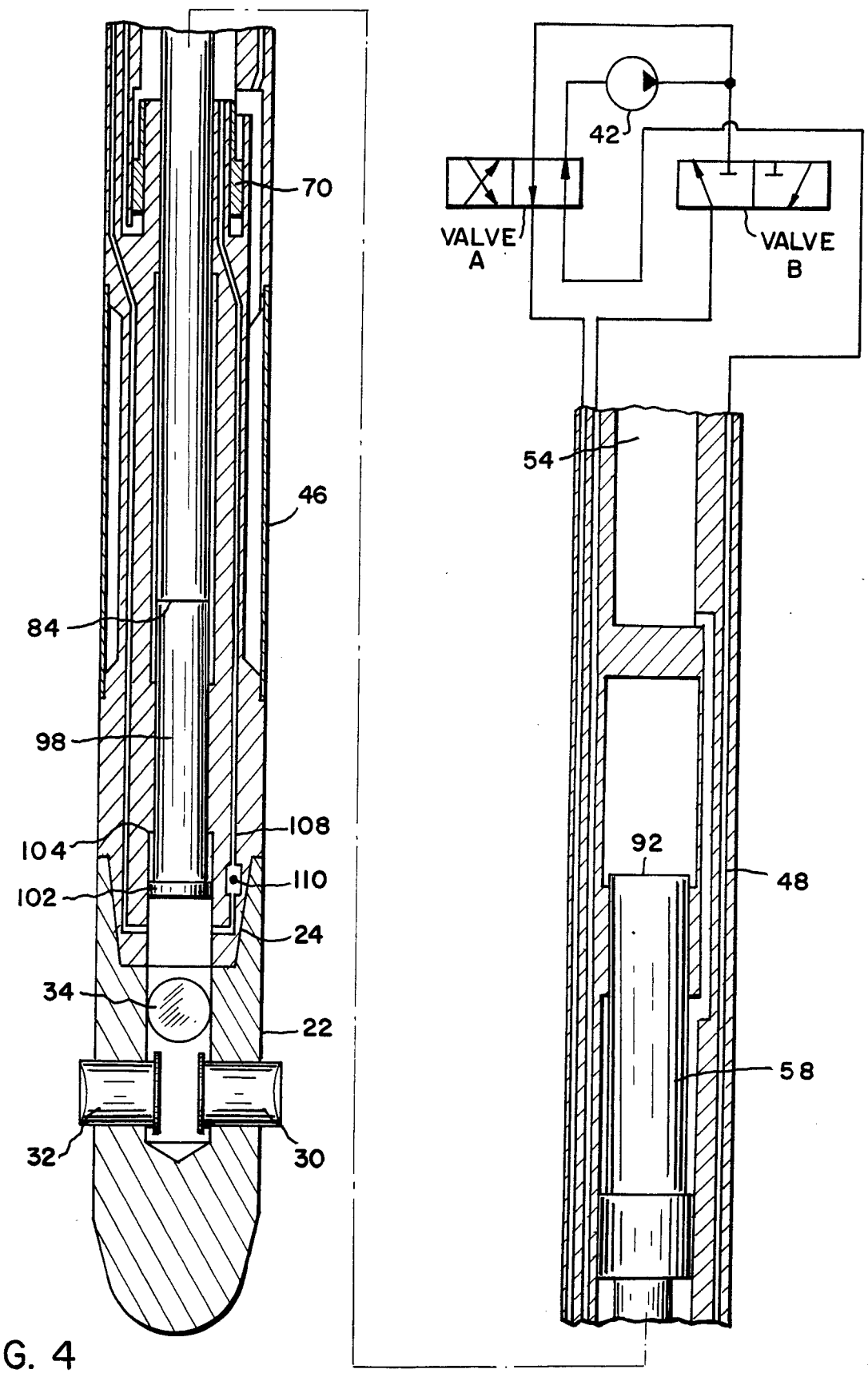

It will be noted that the coupling section 22 in FIG. 1 is of greater diameter than the coupling section as shown in FIGS. 2, 3 and 4. In FIGS. 2, 3 and 4 the coupling section is of the same diameter as the remainder of the housing. This is the diameter of the smallest bore hole in which the source is to be used. For example, where the smallest bore hole is 4 inches, the housing, including the load coupling section thereof may be 3⅜ inch diameter. The different coupling sections are used for larger bore hole diameters so that load coupling pistons 30, 32, 34 and 36 which are retracted when the source is lowered or raised and extended to engage and provide direct coupling to the side walls of the bore hole, need not extend radially more than a limited amount, say ½ inch.

The hydraulic section 14 contains an electric motor 40 and pump 42 in the motor and pump section 16 thereof. The motor is powered by electric current carried on a line with the hoist cable. The inlet and output ports of the pump 42 exit into a manifold block 44. Two control valves, a four-way valve A, and a three-way valve B, are mounted on the manifold block 44. These may be electrically operated spool valves. The control lines for the valves (not shown) also are carried along with the lifting cable.

A transfer barrier (a sleeve of resilient material, such as rubber or some other elastomer) may be arranged around the hydraulic section 14 in the same manner as a similar transfer barrier 46 which forms the periphery of a portion of the hammer section 20. The transfer barrier expands radially and contracts with changes in volume of the region in the housing behind the barrier. The long term volume changes may be made up in order to retain pressure equalization of a transfer barrier in the hydraulic section 14. Short term volume changes are then accommodated by the transfer barrier 46 in the hammer section 20. Alternatively, to elastomeric sleeve transfer barriers, movable piston transfer barriers may be used.

The pump 42 need not develop extremely high pressures in order to generate force impulses of high spectrum energy level. A 2,000 psi pump 42 which is commercially available may be used. The ability of the source to store energy hydraulically enables a relatively small pump to be used. The control valves A and B may also be conventional solenoid operated spool valves.

Figure 5:
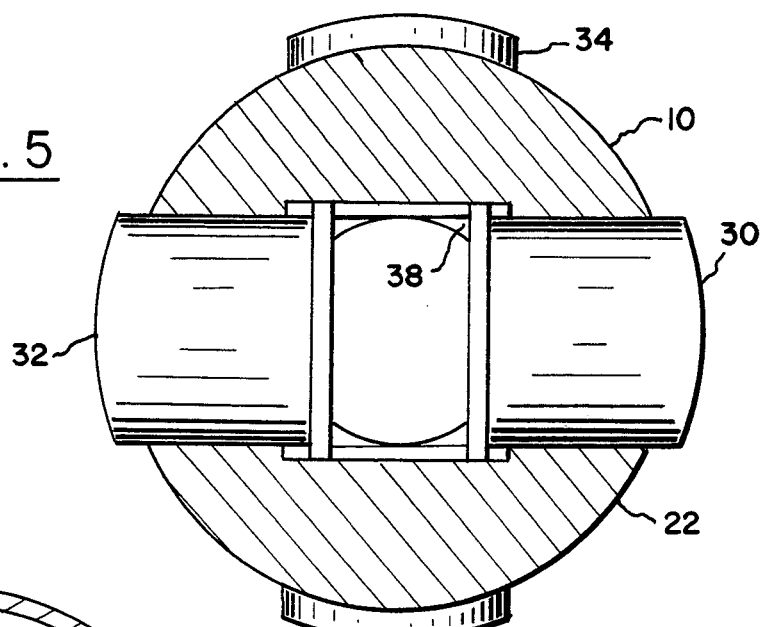
FIG. 5 is a sectional view of the source when in the position shown in FIG. 3, the section being taken along the line 5—5 in FIG. 3.
Figure 6:
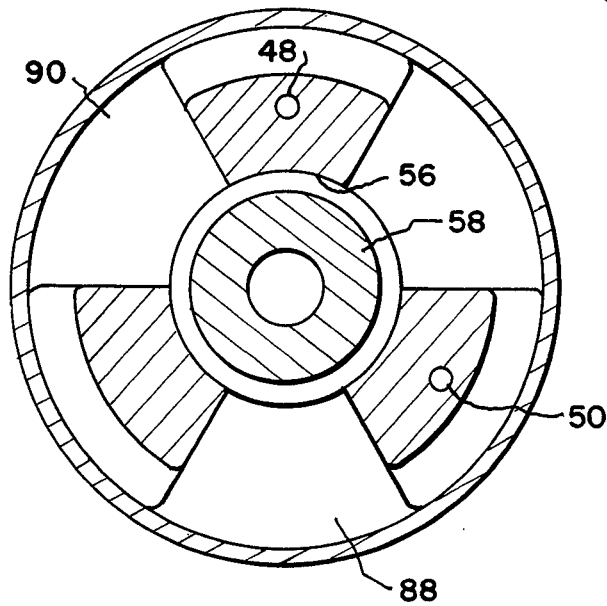
FIG. 6 is a sectional view through the source when in the position shown in FIG. 2, the section being taken along the line 6—6 in FIG. 2.
Figure 7:
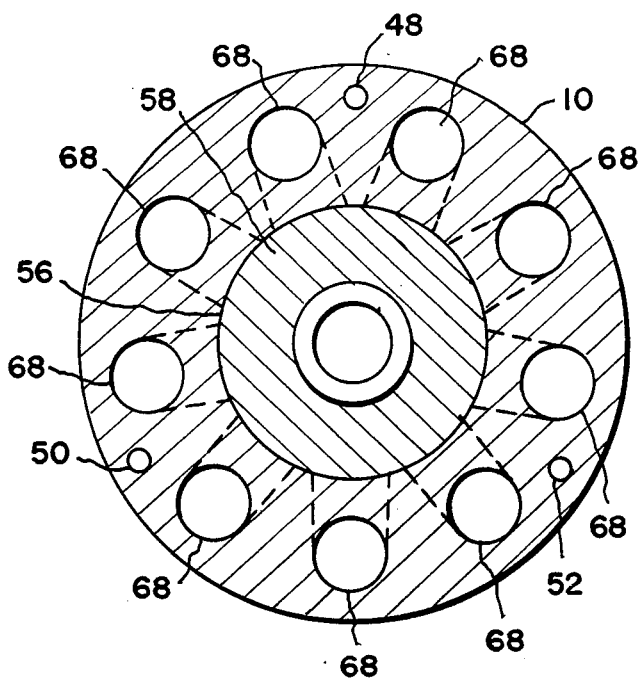
FIG. 7 is another sectional view of the source in the position thereof shown in FIG. 2; the section being taken along the line 7—7 in FIG. 2.

The threaded joints 24, 26, 28 and other couplings and moveable parts may be sealed by O-rings or other suitable seals. Such seals have not been shown in order to simplify the illustration. All hydraulic lines and cavities of the source are contained within the periphery of the housing. Only three hydraulic lines 48, 50 and 52 lead from the hydraulic section 14 to the hammer section 20. Another line (not shown) may be used to make up leakage from a passive, liquid spring cavity 54 in the hammer section 20, if leakage from this cavity becomes a problem. The leakage make up line may extend from the high pressure port of the pump 42 and may be connected to the passive cavity 54 through a check valve which permits flow into the cavity from the pump 42, but not out of the cavity 54 toward the pump 42. It will be noted from FIGS. 6 and 7 that the hydraulic lines are not all in the same plane as shown in the schematic representation of these lines in FIGS. 1 through 4. FIGS. 5 and 6 show the presently preferred locations of these lines 48, 50 and 52.

The hammer section 20 has a bore at the upper end thereof which provides the passive cavity 54 and another bore 56 which extends longitudinally through the center of the housing. A hammer 58 is reciprocally moveable in the bore 56. The hammer has a piston or collar section 60 having opposite surfaces 62 and 64 perpendicular to the direction of movement of the hammer (the longitudinal axis of the source and the housing 10). The lower surface 62 has an area $A_1$ which faces an active cavity 76 in the bore 58. The other surface 64 has an area $A_2$ which faces the passive cavity 54 and is connected thereto by an array of passages 68 (see FIG. 7). This array of passages 68 provides a low resistance and inertance communication between the passive cavity 54 and the cavity facing the $A_2$ surface 64. The area $A_1$ is greater than the area $A_2$ and may suitably be twice $A_2$. It will be seen that the hammer piston section that includes surfaces 62 and 64 provides a hydraulic transformer which increases the pressure of the hydraulic fluid in the passive cavity 54 so as to store energy therein when the hammer is retracted in the upward direction away from an impacting position.

In addition to the control valves, A and B, the valving of the source includes a sleeve valve 70 engageable with a porting surface 72 of the housing provided by an annular region of the bore 56. A large port 74 into the active cavity 76 is opened and closed by the sleeve valve as it is actuated in response to hydraulic pressure in a valve drive cavity 78. The sleeve valve 72 connects the active cavity 76 to a cavity 47 behind the transfer barrier 46. The pressure in the cavity 47 is maintained substantially equal to that of the ambient by the tranfer barrier 46. The sleeve valve 70 presents drive surfaces 80 and 82 at the opposite ends thereof. The upper surface 82 is provided with a step which is brought inside of the active cavity when the valve engages the porting surface 72. The movement of the valve to close the port 74 thus changes the differential area of these drive surfaces 80 and 82 which are presented to the active cavity 76 and the valve drive cavity 78. This enables the valve to be actuated with a regenerative action, discussed more fully below in connection with the operation of the source.

As shown in FIG. 6, a region of the hammer section 20 which is an communication with the lower or impacting end 84 of the hammer 58 is provided with three radial slots 86, 88 and 90. These slots extend to the bore 56. The transfer barrier is of flexible material, such as rubber neoprene or some other elastomer, so that the interior of the housing behind the transfer barrier 46 is at ambient pressure, the same pressure as exists in the bore hole. Accordingly, the source is referenced to ambient pressure. The region below the lower end 84 of the hammer 58 and the region above the upper end 92 of the hammer are pressure equalized by a central hole 94 which extends through the hammer 58.

The coupling section 22 has a tappet 98 provided by a piston which reciprocates in the lower end of the bore 56. The tappet 98 therefore, moves longitudinally. Its motion is downward into the liquid spring cavity 38 in the coupling section 20, when the lower end 84 of the hammer 58 moves into impacting relationship with the upper end 100 of the tappet 96. The tappet 96 also moves upwardly when it is retracted by reason of the pressure in the spring cavity 38 being raised above ambient pressure. Then, a collar 102 engages a step 104 in the bore 58 so as to limit the movement of the tappet 98 in the upward direction.

The coupling section contains the load coupling pistons 30, 32, 34 and 36 (see also FIG. 5). These pistons are arranged in radially opposed pairs; the pistons 30 and 32 being in one pair, spaced longitudinally below the pistons 34 and 36 which constitute another radially opposed pair of the pistons. The pistons are balanced and have collars 106 which act as stops to prevent them from leaving the coupling section when the pressure in the liquid spring cavity 38 increases above ambient pressure. The movement of the pistons is preferably less than ½ inch between their retracted position within (or preferably flush with) the periphery of the coupling section 22 of the housing 10, as shown in FIG. 2 to their fully extended positions. Since the hydraulic system is referenced to ambient pressure, it is required merely that the pressure in the liquid spring cavity 38 be raised or lowered with respect to ambient pressure in order to extend or retract the load coupling pistons.

The force impulses generated when the opposed ends 84 and 100 of the hammer 58 and tappet 98 come into impacting relationship with each other, are transferred through the liquid spring provided by the hydraulic fluid in the cavity 38 and through the load coupling pistons 30, 32, 34 and 36 directly to the side walls of the bore hole and then into the adjacent formation. This defines a precise shot point for the seismic signal. Shoes may be provided at the outer ends of the piston to increase the contact area with the side walls, if desired. The shape of the seismic signal, that is the pulse shape of the force pulse which is coupled to the formation, is controlled by the mass of the hammer 58 and the spring rate presented by the liquid spring in the cavity 38. In a preferred embodiment of the invention, the mass of the hammer and the spring rate presented by the spring is chosen so that the pulse seen by the formation is a damped half-sinusoid. The width of the sinusoid as measured approximately across the time base line thereof is approximately 3 milliseconds in order to maximize the spectral energy in the 50 to 200 Hz band. The coupling means provided in the coupling section 22 makes use of the liquid spring for impedance matching of the hammer to the formation, the conversion of the axial forces created by the impacting of the hammer and the tappet into radial forces and the control of the shape of the signal and therefore its spectral characteristics.

The operating sequence of the source will be seen from FIGS. 2, 3 and 4. In a typical well logging or geophysical exploration operation, the source may first be lowered to the lowest point of the bore hole where a shot is to be made and then is raised from one shot point to the next. When the source is being raised, the control valve A is in the position shown in FIG. 2 so that the pressure in the liquid spring cavity 38 is pumped below ambient pressure and the pistons are forced inwardly (retracted) to a position where they are at least flush with the peripheral wall of the housing 10 in the coupling section 22.

When the shot point is reached, valve A is switched to the position shown in FIG. 3 so that the pressure inside the liquid spring cavity 38 is raised above ambient pressure. Flow is then through the passage 52. The load coupling pistons 30, 32, 34 and 36 are then forced out against the bore hole wall with a contact pressure equal to the pressure produced by the pump 42 (e.g., 2,000 psi). This increased pressure also sets the tappet 98 in its cocked position with the collar 102 against the step 104.

During this piston extending and source cocking portion of the cycle of operation, the control valve B causes supply pressure to be applied through the passage 50 to the valve drive cavity 78. The area of the sleeve valve 70 facing the drive cavity 78 is more than the area thereof facing the active cavity 76. The step portion 82 of the valve 70 is then outside of the active cavity 76, since the port 74 is closed and the valve is against the porting surface 72. The pressure in the active cavity 76 is maintained at the same pressure as in the drive cavity 78 by the pump output which is also directed from the liquid spring cavity 38 through a passage 108 containing a check valve 110. Since the pressure is the same and the area of the lower end of the valve 70 exposed to this pressure is greater than the area of the upper end of the valve, the valve remains in the closed position.

The area $A_1$ of the lower surface 62 facing the active cavity 78 is greater, for example, twice that of the area $A_2$ facing the passive cavity 54. The hammer therefore moves to the extended position shown in FIG. 3. The pressure in the passive cavity is pumped up to twice the pump pressure (from 2,000 to 4,000 psi), since the area $A_1$ is twice that of $A_2$, by hydraulic transformer action.

It is desirable that the hammer section be constructed of titanium or precipitation hardened stainless steel. Titanium is preferable because of its reduced density and lower weight and also because the modulus of elasticity permits the walls of the hammer section which form the walls of the passive cavity 54 to increase the effective compliance of the liquid filled passive cavity 54. For example, 1 kilojoule of energy at 4,000 psi above ambient pressure may be stored in approximately 323 cu. in. of volume in the passive cavity. This assumes a 0.25 in. wall, a hoop stress of 24,000 psi and a cavity length of 50 inches.

Upon a fire command, the hammer moves into impacting relationship with the tappet 98. The source is shown with the hammer in impacting relationship with the tappet in FIG. 4. When the fire command occurs, the control valve B is switched to the position shown in FIG. 4. The pressure in the drive cavity 78 is switched to ambient pressure, releasing the sleeve valve 70. The force on the sleeve valve is regenerative, since the valve opening the port 74 causes a greater area of the valve to be exposed to the active cavity 76. Flow from the active cavity is then ported via the port 74 to the cavity 74 within the transfer barrier 46. The reduction in pressure in the active cavity after the fire command will cause some reduction in pressure in the liquid spring cavity 38, but the long inertive passage 108 will prevent significant motion of the pistons 30, 32, 34 and 36 or of the tappet 98. It will be noted that the cocking and firing portions of the cycle of operation of the source differ in time by over two orders of magnitude.

Quick opening and large porting areas combine to minimize energy losses in the valving process. Upon firing, the hammer velocity increases sinusoidally until it reaches its peak amplitude, at which point it strikes the tappet 98. The volume of the liquid spring cavity 38 and the tappet area exposed to the cavity 38 control the peak pressure in the cavity 38, for example, to 10,000 psi, and maintain the time of engagement of the hammer and tappet (the pulse duration) to the desired duration (approximately 3 milliseconds for spectral energy of the pulse maximized between 50 and 200 Hz). The peak contact pressure with the walls of the bore hole (casing if the bore hole is cased) will be increased, say to 10,000 psi. If shoes are added to the pistons 30, 32, 34 and 36 the force due to the contact pressure can be spread out.

After impact the hammer 56 rebounds. The rebound time is independent of amplitude and is determined principally by the mass of the hammer and the spring rate of the passive cavity 54 liquid spring. The control valves A and B are returned to the position shown in FIG. 2 after impact to reseat and close the sleeve valve 70 and apply pressure to arrest the hammer 58 as it reaches the peak of its rebound. The reclosing of the sleeve valve 70 is also regenerative; the hammer 56 tending to pull the valve 70 closed behind it as it moves upwardly in the retract direction. Accordingly, any impact of the upper end 92 of the hammer 58 with the housing will either be absent or with such a low velocity as to produce a negligible amplitude force pulse.

From the foregoing description it will be apparent that there has been provided an improved seismic source and particularly a seismic source which is self-contained and adapted to be used down deep bore holes. Other applications of the source and variations and modification of the herein described embodiment thereof, within the scope of the invention, will undoubtedly suggest themselves to those skilled in the art. Accordingly, the foregoing description should be taken as illustrative and not in a limited sense.

We claim:

1. A seismic source for use in bore holes comprising a housing having an elongated shape and cross section to be received within a bore hole and to be raised and lowered therein, pressurized hydraulic fluid supply and control means, hydraulically operated hammer means, means for coupling force impulses received from said hammer means to the wall of said bore hole at selected positions along the length thereof, said hydraulic fluid supply and control means, hammer means and coupling means all being disposed in said housing, said hammer means comprising a hammer moveably mounted in said housing for reciprocal movement longitudinally thereof to bring an end thereof into and out of impacting relationship with said coupling means, passive and active hydraulic fluid filled cavities in said housing, said hammer having first and second areas disposed perpendicular to the direction of movement of said hammer, said first area being in communication with said active cavity and said second area being in communication with said passive cavity, said first area being larger than said second area to define with said hammer a hydraulic transformer for increasing the pressure of said hydraulic fluid in said passive cavity above the pressure of the hydraulic fluid in said active cavity when said hammer moves in response to the pressure in said active cavity in a direction opposite to the direction which brings said hammer into impacting relationship with said coupling means, and valve means for switching the pressure of the hydraulic fluid in said active cavity between relatively high and relatively low pressures.

2. The invention as set forth in claim 1 wherein said valve means comprises a sleeve valve reciprocably mounted in said housing for movement in said longitudinal direction and defining an active cavity and a valve drive cavity, said active cavity facing said first area, said sleeve valve having third and fourth areas perpendicular to said longitudinal direction, said third area facing said active cavity, said fourth area facing said valve drive cavity, said first area having a step, a porting surface in said housing, said valve being engageable with said porting surface to bring said step inside of said active cavity, said third area (less said step) being smaller than said fourth area.

3. The invention as set forth in claim 1 wherein said passive cavity defines a liquid spring for storage of hydraulic energy when said hammer reciprocates in a direction out of impacting relationship with said coupling means and for the delivery of stored hydraulic energy to said hammer when it reciprocates in the direction into impacting relationship with said coupling means.

4. The invention according to claim 3 wherein said housing has a longitudinal bore longer than said hammer in which said hammer is reciprocally moveable, said bore having a section in which moves said end of said hammer which delivers the impact to said coupling means, passage means extending radially through said housing in said bore section for communicating said bore section with the ambient pressure in the bore hole, and a hole longitudinally through said hammer for equalizing the pressure within said hammer and at the opposite ends thereof with said ambient pressure.

5. The invention according to claim 4 wherein said coupling means includes a tappet longitudinally moveable in said housing, one end of said tappet being opposed to said impact delivering end of said hammer, a hydraulic fluid filled liquid spring cavity in said coupling means defined by said housing and the end of said tappet opposite to said one end thereof.

6. The invention according to claim 5 wherein said valve means comprises a sleeve valve reciprocally mounted in said housing for movement in said longitudinal direction and defining active and valve drive cavities, said active cavity facing said first area and further comprising means for providing communication between said coupling means liquid spring cavity and said active cavity.

7. The invention according to claim 6 wherein said active cavity to coupling means liquid spring cavity communication providing means is a passage in said housing having a check valve therein permitting flow of hydraulic fluid only from said coupling means liquid spring cavity to said first section, porting means including said sleeve valve coupling said active cavity to a region at ambient pressure in said bore hole, said valve means comprising means for enabling the flow of pressurized fluid from said fluid supply into said valve drive cavity to actuate said sleeve valve to close said active cavity and to enable flow of pressurized fluid into said coupling means liquid spring cavity to move said hammer in said direction out of impacting relationship and said tappet in the same direction out of impacting relationship to cock said tappet and hammer of said source.

8. The invention according to claim 7 wherein said valve means also comprises means for enabling the flow of said hydraulic fluid out of said valve drive cavity to actuate the sleeve valve to open said active cavity to said region at ambient pressure and fire said source moving said hammer into impacting relationship with said tappet.

* * * * *